(12) United States Patent
Ellis et al.

(10) Patent No.: US 7,900,394 B2
(45) Date of Patent: Mar. 8, 2011

(54) ENTANGLED COTTON BYPRODUCTS AND BIOFIBER HYDRAULIC MULCH- EROSION CONTROL PRODUCTS, AND THE PROCESS FOR THEIR MANUFACTURE

(76) Inventors: Andy Ellis, Centre, AL (US); Wae Ellis, Centre, AL (US); Luke Richardson, Birmingham, AL (US)

(*) Notice: Subject to any disclaimer, the term of this patent is extended or adjusted under 35 U.S.C. 154(b) by 405 days.

(21) Appl. No.: 12/218,979

(22) Filed: Jul. 17, 2008

(65) Prior Publication Data

US 2009/0189000 A1  Jul. 30, 2009

Related U.S. Application Data

(63) Continuation-in-part of application No. 11/121,238, filed on May 3, 2005, now abandoned.

(60) Provisional application No. 61/123,964, filed on Apr. 11, 2008.

(51) Int. Cl.
*A01G 7/00* (2006.01)
(52) U.S. Cl. .............................................................. 47/9
(58) Field of Classification Search ................. 47/9, 56, 47/58.1 SC
See application file for complete search history.

(56) References Cited

U.S. PATENT DOCUMENTS

| | | | | |
|---|---|---|---|---|
| 4,369,054 A | * | 1/1983 | Shinholster et al. | 71/25 |
| 6,349,499 B1 | * | 2/2002 | Spittle | 47/9 |
| 6,360,478 B1 | | 3/2002 | Spittle | |

* cited by examiner

*Primary Examiner* — Timothy D Collins
*Assistant Examiner* — Monica Williams
(74) *Attorney, Agent, or Firm* — Ober/Kaler; Royal W. Craig

(57) ABSTRACT

A method for making a hydraulically applied mulch using a natural biofiber material preferably comprising of 100% cotton byproduct or a mixture of cotton byproducts and other biomaterials selected such as, hay, grass, kenaf, straw, coconut, bamboo, hemp, bagasse and plant residue (cereal grains, rice, soybeans, grass seed, wood, sawdust, wood pulp, paper, or mixtures thereof). These fibers bear a natural waxy coating. The method includes the optional step of introducing the shredded biofiber composition into a first steaming chamber to stem the biofiber composition, followed by shredding the biofiber composition, and then introducing the shredded biofiber composition into a second steaming chamber to steam, break down and create porosity in the waxy coating of the fibers causing the fibers to become more hydrophilic. The biofibers are steamed followed by drying causing them to curl or physically deform. The shredded and steamed biofiber composition is then mixed to entangle the fibers, and the shredded, mixed and steamed biofiber composition is introduced into a drying chamber for drying, the resulting composition is then cooled and packaged, ready for mixing with water and spray application. The shredded, steamed and dried composition promotes entanglement of the fibers in a 3-dimensional matrix suitable for use as hydraulically applied mulch, and binding agents (tackifiers), dyes, rewetting agents, activators, and other additives may be added as desired.

36 Claims, 3 Drawing Sheets

ENTANGLED COTTON BYPRODUCTS AND BIOFIBER HYDRAULIC MULCH- EROSION CONTROL PRODUCTS, AND THE PROCESS FOR THEIR MANUFACTURE

CROSS-REFERENCE TO RELATED APPLICATIONS

The present application is a continuation-in-part of co-pending application Ser. No. 11/121,238 by Holt et al. filed 3 May 2005, and derives priority from U.S. provisional application Ser. No. 61/123,964 filed Apr. 11, 2008.

BACKGROUND OF THE INVENTION

1. Field of the Invention

The present invention generally relates to landscaping and erosion control mulch and, more particularly, to a sprayable mulch composition formed of 100% cotton plant materials, or a mix of cotton byproduct and/or biomass, and a method of manufacture wherein at least one of the components is fiberized (shredded), steamed and dried so that when the components are mixed the shredded fibers entangle about unshreaded components and/or one another to form a 3-dimensional fiber-entangled matrix. In the manufacture of this mulch, a steaming process contributes to make the mulch fibers more hydrophilic, therefore promoting absorbency of water, dye or pigments, and other performance enhancing agents.

2. Description of Prior Art

It has long been a topic of research to find a way to utilizing the 2.5 million plus tons (calculated from data in 1997 Census of Agriculture) of byproducts from cotton ginning. Some of this research has focused on various applications ranging from using cotton gin byproducts (CGB) as fire logs. Karpiscak et al., *Densification of cotton gin trash into fireplace fuel* (1982); Beck and Clements, *Proc. Of the Symposium of Cotton Gin Trash Utilization Alternatives*, National Science Foundation, pp. 87-99. (1982); *Ethanol production from cotton gin trash*, Proc. of the Symposium of Cotton Gin Trash Utilization Alternatives, National Science Foundation et al., pp. 163-181; Lacewell et al., *Pelleting cotton gin trash for energy*, Proc. of the Symposium of Cotton Gin Trash Utilization Alternatives, National Science Foundation et al., pp. 141-161 (1982); LePori at al., *Energy from cotton gin trash*, Proc. of the Symposium of Cotton Gin Trash Utilization Alternatives, National Science Foundation et al., pp. 101-117 (1982); Parnell et al., *Converting cotton gin trash into usable energy—technical and economical considerations*, Proc. Beltwide Cotton Conferences 2:969-972 (1991); White et al., *Conversion of cotton plant and cotton gin residues to fuels by the extruder-feeder liquifaction process*, Bioresource-Technology 56:1, 117-123 (1996), livestock feed (Holloway et al., 1974, *Feeding gin trash to beef cattle*, Bulletin Mississippi Ag. Exp. Stn. 818, 9p; Conner and Richardson, 1987, Utilization of cotton plant residues by ruminants, Journal of Animal Science 65(4) 1131-1138; Poore and Rogers, 1995, *Feeding whole cottonseed and other cotton by-products to beef cattle*, veterinary-Medicine 90:11, 1077-1087), raw materials in asphalt roofing products (Kolarik and Smith, 1978, Economic evaluation of south plains (Texas) ginning waste as a raw material in the production of roofing felt, Report prepared for Cotton Incorporated, Agreement No. 78-383, 72p), and compost (Hills, 1982, *Composting gin trash in California*, Proc. of the Symposium of Cotton Gin Trash Utilization Alternatives, National Science Foundation et al., pp. 63-86; Shumack et al., 1991, *Using gin trash in composted soil ingredients*, Proc. Beltwide Cotton Conferences 1: 498-499; Truhett, 1994, *Developing markets for composted gin waste*, Proc. Beltwide Cotton Conferences 1:609; Ayers, 1997, *Farmer composting of cotton gin trash*, Proc. Beltwide Cotton Conferences 2: 1615-1616).

The amount of research that has been performed on this subject is more extensive than indicated in the examples above. For a more thorough overview of previous research efforts, refer to Thomasson, *A Review Of Cotton Gin Trash Disposal And Utilization*, Proc. Beltwide Cotton Conferences, pages (1990).

Canadian Patent Application No. CA 263,672 by Lloyd discloses a process for manufacturing a mulch material by breaking down vegetable fibers by crushing and/or swelling until the cell structure of said vegetable fibers is opened, separating the fibers, and drying the separated fibers. The mulch material may be used in seed slurries sprayed onto growing surfaces. Lloyd also states that the mulch must be dried at a temperature below 40° C. to ensure that the material is not sterilized and the biologically active bacteria and enzymes are maintained.

More recently, Holt et al. (U.S. Pat. No. 6,383,548) developed a process for converting cotton gin trash and other cotton byproducts into value added products. As described therein, the cotton byproducts are treated with a gellable polysaccharide and subsequently or concurrently ground and compacted. The resultant products may be used as livestock feed, fertilizer, fuel, or mulch. For the mulch, subsequent efforts have focused on improving the workability.

For example, application Ser. No. 11/121,238 by Holt et al. filed 3 May 2005 covers a sprayable or matted mulch composition formed of a mix of cotton byproduct and biomass (hay, grass, kenaf, straw, plant residue, sawdust, wood pulp, paper, etc.), wherein at least one of the components is fiberized (shredded) so that when the components are mixed the shredded fibers entangle about the other component to form a 3-dimensional cross-linked matrix. Specifically, the composition must include at least two components: 1) cotton byproduct (any of burs, sticks, leaves, motes, neps, immature seeds, seed hulls, seed coat fragments, cotton gin byproducts, byproducts from textile mills, byproducts from cottonseed oil mills, and mixtures thereof); and 2) cellulosic (plant derived) hay, grass, kenaf, straw, plant residue, sawdust, wood pulp, paper, or mixtures of any of the above. Either one or both components may be fiberized (shredded), and a preferred ratio of 1) to 2) is 1:9 to 6:4, by weight. The first and second components are sufficiently mixed together to intermingle and entangle the fibers of one component about the other component to form a substantially homogeneous mixture in a 3-dimensional cross-linked matrix. This makes the composition more suitable for use as sprayable hydromulches or as preformed, rolled blankets which are laid upon the soil.

In addition to the foregoing advances, it has now been found that the qualities of spray-on mulch can be improved by altering the production process. More specifically, steaming of the natural fibers followed by drying causes them to shrivel, curl, and physically deform, thereby improving the tendency of the shredded fibers to entangle about the other components to form a 3-dimensional fiber entangled matrix. Steaming also enhances performance by causing the fibers to become more hydrophilic.

U.S. Pat. No. 6,360,478 to Spittle issued Mar. 26, 2002 heating and/or steam treating natural fibers or coating and/or impregnating to create a permanently crimped fiber, and suggests that natural fibers must be heated to relatively high temperatures for a time sufficient to partially break down some of the lignocellulosic or proteinaceous components.

However, the extent of the process disclosed requires mechanical crimping or fiber deformation imparted by an external mechanical means in which the fibers are placed in a metal tray in an environmentally controlled oven and are periodically sprayed with a mist of water.

The present inventors have found that a sprayable mulch formed of 100% cotton plant materials, or a mix of cotton byproduct and/or biomass, and a particular method of manufacture that additionally includes fiberizing (shredding) one or all components, coupled with particular steaming and drying steps further promotes the ability to form a 3-dimensional fiber entangled matrix. The present inventors' novel combination of steaming and drying promote fiber entanglement while leaving the fibers malleable enough to be displaced or deformed by plants as they emerge through the mulch from the seedbed below.

SUMMARY OF THE INVENTION

It is a primary object of this invention to provide improved value added products from cotton byproducts.

Another object of this invention is to provide biodegradable mulches providing improved protection from soil erosion.

A further object of this invention is to provide improved hydraulically applied mulches having superior soil adhesion, and which exhibit improved dewatering characteristics.

A further object of this invention is to provide improved sprayable mulches having superior aesthetic appeal given the ability of the manufacturing process to promote the desired level of dye or pigment absorption and retention.

A further object of this invention is to provide a method for dying or adding pigments to straw, cotton, corn, hay, grass, rice, soybeans, hemp, kenaf, corn and other biofiber components to be used in the manufacture of erosion control blankets.

A further object of this invention is to provide improved hydraulically applied mulches having an increased time required for complete decomposition by drying above 90° C. to reduce or eliminate microbial activity.

In accordance with the foregoing objects, the present invention is a method for making a sprayable mulch. The method generally comprises the steps of obtaining a quantity of a biofiber composition comprising a natural fibrous material which fibers bear a natural waxy coating, introducing the biofiber composition into a first steaming chamber to obtain proper moisture levels, cleaning the steamed biofiber composition, then shredding/fiberizing the biofiber composition. The biofiber composition is steamed a second time to break down and create pores in the waxy coating of the fibers causing them to become more hydrophilic, and in conjunction with drying, cause the natural fibers to curl and entangle about one another. The shredded and doubly-steamed biofiber composition is mixed to promote entanglement of the fibers, and the shredded, mixed and steamed biofiber composition is introduced into a drying chamber for drying. The composition is dried at a temperature exceeding 90° C. with the intention of reducing microbial activity and therefore increasing the time required for complete decomposition of the mulch material. The resulting composition is then cooled and packaged, ready for mixing with water for spray application. The biofiber composition preferably comprises a 100% cotton byproduct or mixture of cotton byproducts and other biomaterials selected such as hay, grass, kenaf, straw, coconut, bamboo, hemp, bagasse and plant residue (cereal grains, rice, soybeans, grass seed, wood, sawdust, wood pulp, paper, or mixtures thereof). The shredded, doubly-steamed and dried composition promotes entanglement of the fibers in a 3-dimensional matrix suitable for use as hydraulically applied mulch, and binding agents (tackifiers), dyes, rewetting agents, activators, seed establishment enhancers and other additives may be added as desired. Using a ratio of cotton byproduct and plant material processed by shredding, steaming and drying, yields a spray-on mulch product that quickly absorbs greater amounts of water per unit volume relative to similar products that are not processed in this way.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
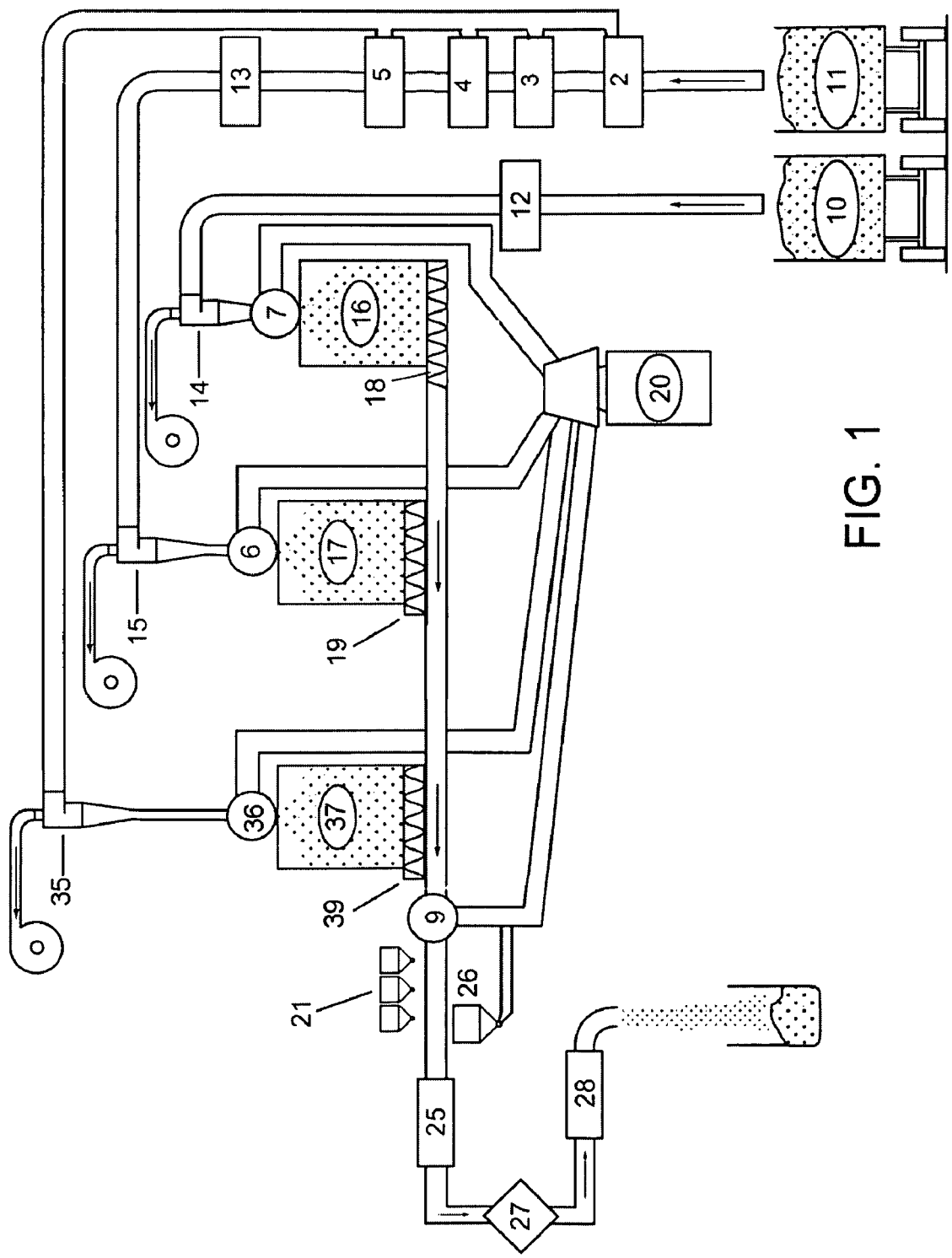
FIG. 1 is a schematic diagram of a preferred system for implementing the process for the production of the spray-on mulch product according to the present invention wherein all components are fiberized.

The present invention is a sprayable mulch composition formed of 100% cotton plant materials, or cotton byproduct, hay, grass, kenaf, straw, coconut, bamboo, hemp, bagasse and plant residue (cereal grains, rice, soybeans, grass seed, wood, sawdust, wood pulp, paper, or mixtures thereof), or a mixture thereof in which one or all of the components are fiberized (shredded) to promote entanglement of the shredded fibers about one another to form a 3-dimensional fiber entangled matrix. The composition is processed by a novel combination of steaming followed by dry heating (preferably convection, but microwave or other dry heat is possible). The steam breaks down the waxy coating of the cotton byproduct and biomass making it more hydrophilic and therefore promoting absorption of water and additives, thereby facilitating spray application with a pump. The steaming also allows the matrix to remain softer and less rigid, allowing vegetative sprouts from the seedbed below to push through the material, promoting faster vegetation establishment. After steaming, the dry heating process extracts moisture from the composition so it can be packaged in a manner that will not promote premature decomposition.

More specifically, the composition includes at least one of two cellulosic biofiber components including: 1) cotton byproduct from among the group of "lint" (the mass of soft fibers surrounding the seeds of unginned cotton), "linters" (the short fibers that cling to cottonseeds after the first ginning), burs, sticks, roots, leaves, motes, neps, immature seeds, seed hulls, seed coat fragments, cotton gin byproducts, byproducts from textile mills, byproducts from cottonseed oil mills, field residue and mixtures thereof); and/or 2) cellulosic (plant derived) hay, grass, kenaf, straw, coconut, bamboo, hemp, bagasse and plant residue (cereal grains, rice, soybeans, grass seed, wood, sawdust, wood pulp, paper, or mixtures thereof). The cotton byproduct may be provided within a range of from 0-100%, the cellulosic plant material making up the balance. In a preferred embodiment a mixture of the two biofiber components is employed in a ratio (component 1:2) within a range of from 1:9 to 6:4, by weight. At least one (or both components) are fiberized (shredded) to promote entanglement.

The cotton byproducts suitable for use in the composition of the invention may be obtained from a variety of cotton processing facilities, including but not limited to the byproducts (waste) from cotton gins, textile mills, and cottonseed oil mills. Depending upon the particular source selected, these byproducts primarily consist of one or more of lint, linters, burs, sticks, roots, leaves, neps or motes, immature seeds, seed hulls, and seed coat fragments. Of these components, burs and sticks can be present in the greatest amounts (by weight) in unprocessed cotton gin waste, which is the preferred cotton byproduct for use herein.

The inventors have discovered that separating the components of the cotton byproduct and processing them separately can yield mulch fibers that exhibit different beneficial qualities, which includes improved control of the aspect ratio of each separated component. For example, cotton linters are fine, silky fibers which adhere to the seeds of the cotton plant after ginning. If the cotton byproduct includes lint and/or linters, the lint and/or linters in the composition (without chemical modification) will be more naturally absorbent than the other components. This quality makes them more suitable for certain applications as hydraulically applied mulch or as other forms of erosion control products. However, given that the lint/linters are processed in the same way as the other components, the post-processed lint and/or linters will not exhibit the same aspect ratio (length to diameter ratio) as would the other components (stems, sticks, burs, etc.). Therefore, for embodiments in which cotton byproduct is used of the type including lint and/or linters, it is preferable to separate the stems, sticks, burs, leaves, and roots from the lint and/or linters so that the moisture content, temperature, and processing steps can be independently controlled. Controlling the conditions separately also helps to yield closer control over the individual particle or fiber sizes of these separate components so as not to excessively pulverize (or fail to adequately reduce the size) of one component relative to the other component. When processed separately the average fiber length (measured by weight) of the stems, sticks, burs, etc., is preferably greater than 4 mm, and more preferably greater than 8 mm.

Component separation of the lint/linter components of the cotton byproduct can be accomplished through the use of an incline cleaner, impact cleaner, bur extractor, green leaf and stick machine, and/or refined cotton lint extractor, or any combination of the foregoing. One skilled in the art will understand that the amount of processing required (and the amount of equipment used) to separate the lint/linter from the remaining cotton plant materials will be largely dependent upon the makeup of the initial cotton byproduct. For example, cotton byproduct from stripper cotton which is typically grown in West Texas will have greater quantities of sticks, burs, leaves, and other plant materials when compared to upland varieties of cotton that are typically grown in Alabama and Mississippi, and could require more processing to adequately separate the lint from the other woody plant materials.

Once the components of the byproduct composition have been sufficiently separated they can be cut to length and fiberized separately which affords the opportunity to control the aspect ratio of each component individually. Controlling the length and aspect ratio of the components individually affords the opportunity to have longer plant material fibers in the mulch while reducing the cotton lint to a length that will be suitable for pumping. Following processing the lint/linters may be re-mixed with the other plant materials to obtain the desired properties. If desired, the separated components can be used individually as hydraulically applied mulch depending on the desired mulch properties for the specific application.

If used, the second cellulosic biofiber component may be selected from a variety of plant materials or paper, including, but not limited to, hay, grass, kenaf, straw, coconut, bamboo, hemp, bagasse and plant residue (cereal grains, rice, soybeans, grass seed, wood, sawdust, wood pulp, paper, or mixtures thereof), sawdust, wood pulp, paper (including shredded or ground), or mixtures of any two or more of the above. Of these, use of hay, grasses, kenaf, straw, and plant residues remaining after crop harvest, are preferred. Moreover, while sawdust is suitable for use in products intended for applications such as insulation, it is not desirable for use in mulches due to its small particle size. The relative amounts of the first and second components are variable, and when more than one component is used preferred ratios of the first component (cotton byproducts) to the second component are between about 5:95 to about 7:3, by weight, more preferably between about 1:9 to about 6:4, by weight. As a specific example, the first component may include up to 25% of cotton byproducts measured by weight, and the balance of the second cellulosic biofiber component may comprise a mixture of straw, hay, coconut fibers, wood or cellulose fibers, jute fibers, hemp fibers, bamboo fibers, and kenaf fibers in equal amounts.

Figure 2:
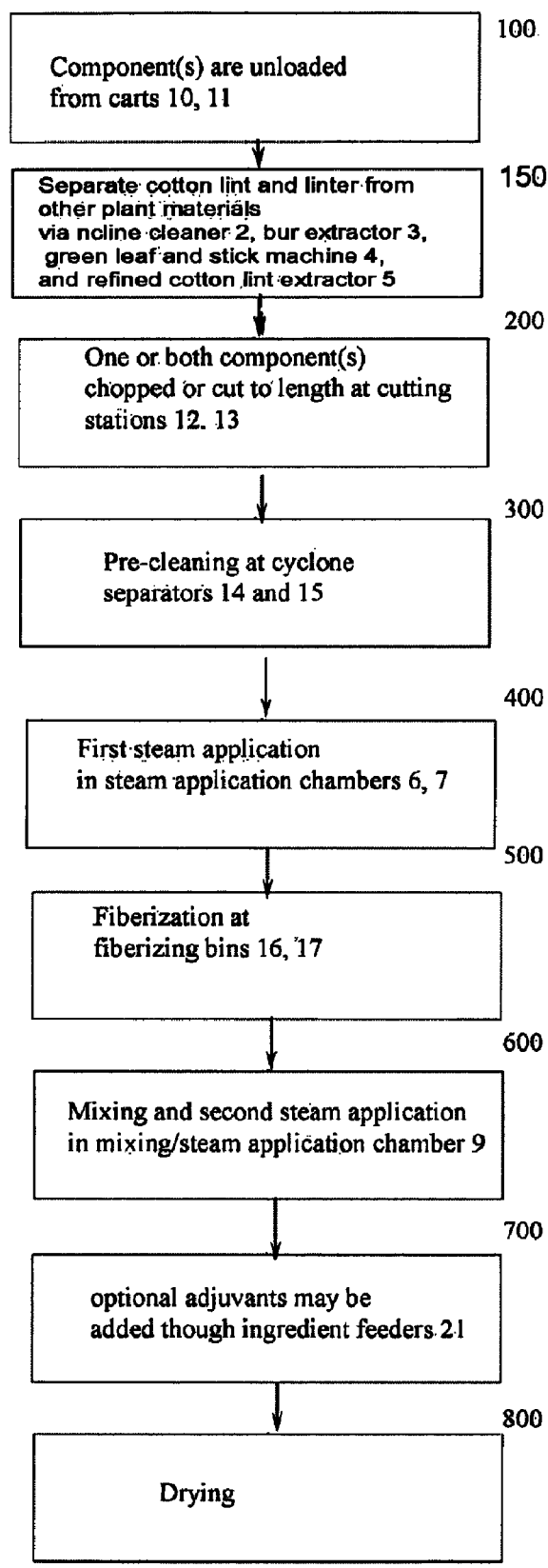
FIG. 2 is a block diagram of the process for the production of the mulch product of the present invention.

FIG. 1 is a schematic diagram of a preferred system architecture for the production of the composition of the invention wherein both of the first and second components are steamed before being fiberized. FIG. 2 is a block diagram of the process.

With combined reference to FIGS. 1 and 2, at step 100 the cotton byproduct (lint, linters, burs, sticks, leaves, motes, neps, immature seeds, seed hulls, seed coat fragments, cotton gin byproducts, byproducts from textile mills, byproducts from cottonseed oil mills, and mixtures thereof) are unloaded from cart 11, while cellulosic (plant derived) material is unloaded from cart 10.

At step 150, the preferred method for separating the cotton lint and/or linters from the remaining cotton byproduct (stick, burs, stems, leaves, and other plant materials) is to process through an incline cleaner 2, bur extractor 3, green leaf and stick machine 4, and finally a refined cotton lint extractor 5, all in series. The incline cleaner 2, bur extractor 3, and green leaf and stick machine 4 are all well-known and commercially-available components of cotton processing equipment. A refined cotton lint extractor 5 is less well-known but examples may be found such as PCT application no. WO/2005/028090 published 31 Mar. 2005.

The materials that exit the incline cleaner 2 from two separate streams: a main stream containing primarily other cotton plant materials and the diverted stream containing the cotton lint. Likewise, each successive processing step at bur extractor 3, green leaf and stick machine 4, and refined cotton lint extractor 5 will further separate cotton lint from other plant materials (sticks, stems, burs, leaves, etc.) and deposit the separated materials into the appropriate stream. Once the material has exited the refined cotton lint extractor 5 the composition of the primary stream of plant materials (stick, stems, burs, leaves, etc.) will preferably contain less than 5% cotton lint by weight, more preferably less than 3%, and most preferably less than 1%.

The first component (cotton byproduct), second component (cellulosic plant derived material) are then separately conveyed to respective cutting stations 12, 13.

At step 200 one or both of the first and second components are cut at cutting stations 12, 13 to reduce the size of the raw materials by cutting them to length. However, the extent of chopping or cutting should not be so extensive that the fibers are reduced to a size which is too short to facilitate intertwining about one another to form a stable 3-dimensional matrix. The actual suitable minimum fiber length will vary with the particular application of the composition. Thus, without being limited thereto, for mulches the material is preferably cut to a mean size (length) less than about 25 mm. Either one or both of the cotton byproduct component and the second cellulosic biofiber component may initially be chopped or cut to length. However, depending upon the selection of the material for the second component (if used), and particularly when using wood or crop harvest residues, it is usually preferred to treat both components in like fashion.

At step 300 the cut-to-length first and second components are then conveyed from respective cutting stations 12, 13 to cyclone separators 14 and 15, respectively, for precleaning and to remove excessively small dirt and dust particles. Likewise, the separated cotton lint and/or linters from the cotton byproduct may be conveyed to a cyclone separator 35.

From the cyclone separators 14, 15 and 35, the cleaned components may optionally be subjected to steam processing in steam application chambers 6, 7 and 36 at step 400. This first stage steaming maintains the desired moisture level so that the components are not excessively pulverized during subsequent fiberization. The steam application chambers 6, 7 and 36 may include a conventional boiler 20 feeding three non-pressurized in-line chambers through ductwork. The steam brings the composition to a desired moisture level, and also softens the materials. Once the materials have reached the desired moisture level and hardness (stiffness) they can be fiberized to the desired aspect ratio without being excessively pulverized. Without being limited thereto, the preferred aspect ratio (length to width/diameter) for the secondary component (straw, hay, kenaf, coconut, et. al.) would be greater than 6 and more preferably greater than 12. Preferably, the steam application chambers 6, 7 and 36 (though non-pressurized) will inherently elevate the vessel's internal pressure as shown below by virtue of the steam injection, and will elevate the temperature. One skilled in the art should understand that the desired temperature will be dependent upon the volume of steam added, and the volume of steam will be dependent upon moisture content of the incoming component materials. The presently preferred conditions inside the steam application chambers 6, 7 and 36 are as follows:

Pressure Range: atmospheric to 207 kPa
Temperature Range: 93° C. to 204° C.

After steaming, at step 500 the cut-to-length, cleaned and steamed first and second components are delivered to respective fiberizing bin 16, 17 where they are then shredded (fiberized). Likewise, the cut, cleaned and steamed cotton lint and/or linters derived from the cotton byproduct may be conveyed to its own fiberizing bin 37.

Shredding or fiberization of the biofiber components may be affected using a variety of techniques known in the art, and the particular technique is not critical. Without being limited thereto, in the preferred embodiment, the first or second components, and the cotton lint/linter may be fiberized by shredders that tear or rip the material along its length as it moves or is conveyed between a pair of discs or generally cylindrical rollers. These discs are positioned with the axes thereof approximately parallel to one another, and with their outer surfaces adjacent or contiguous, either in contacting or closely spaced relationship. The discs are adapted or constructed to rotate in opposite directions to promote passage and flow of the forage material there between with, for example, one disc rotating clockwise, and the other rotating counterclockwise. Alternatively, one of the discs may be stationary.

For the purposes of this invention, "fiberized" refers to the longitudinal splitting and/or sheering of the material along the length of the fibers to produce individual fibers which are dispersed such that the integrity of the individual fibers in the fibrous material is substantially retained. These fibers are then subsequently intertwined about one another and any other fiberous component of the composition in a 3-dimensional array or matrix. As used herein, fiber integrity being "substantially retained" refers to greater than 50% of the individual fibers maintaining their initial length (i.e., their length prior to being fiberized). In other words, less than 50% of the individual fibers are reduced in length by the fiberization step as determined by sieve analysis. Thus, for mulches in general, more than 60% by weight of each of the first and second components in the final composition should have a fiber length greater than 1.5 mm, and more than 40% by weight of the first and second components, preferably more than 50%, should have a fiber length greater than 4 mm (all measured after fiberization). In addition, the cotton lint component shall preferably have an Upper Quartile Length between 6.3 mm and 19.1 mm as measured indirectly by weight by Advanced Fiber Information System (AFIS). AFIS measures weight indirectly by measuring the length and diameter of the cotton lint fiber and by then using typical cotton lint density values to determine the weight. The short (defined as less than 12.7 mm) lint fiber content as measured by AFIS shall preferably be greater than 50%. Short lint fiber percentage is based on a numerical count rather than direct or indirect weight. In the development of this novel product and process it was determined that if significant proportions of the fibers exceeded 25 mm a user would likely be unable to pump the mulch slurry without issue through standard hydroseeding or hydromulching equipment with centrifugal pumps.

From the fiberizing bins 16, 17 and, 37, the cut-to-length, cleaned, steamed and fiberized first and second components, as well as the cut-to-length, cleaned, steamed and fiberized cotton lint/linters, are respectively delivered by screw conveyors 18, 19 and 39 for further processing.

At step 600 the cleaned components may be recombined, and are subjected to secondary steam processing in steam application and mixing chamber 9. The steam application chamber 9 is likewise a non-pressurized chamber steam-fed through ductwork by the same conventional boiler 20. The biofiber compositions will comprise a natural fibrous material which fibers bear a natural waxy coating. At this step, the steam breaks down the waxy layer (as described below) and makes the mulch fibers more hydrophilic, therefore promoting absorbency of dye or pigments and other performance enhancing agents. In addition, this secondary steaming performs a sterilization by which substantially any seeds and/or weeds present in the raw byproducts are killed (or sterilized), as well as any pathogenic bacteria or fungi therein. Again, the steam application chamber 9 (though non-pressurized) will inherently elevate the internal pressure as shown below by virtue of the steam injection, and will elevate the temperature. The presently preferred conditions inside the steam application chamber 9 may be identical to chambers 6, 7 and 36 as follows:

Pressure Range: atmospheric to 207 kPa psi
Temperature Range: 93° C. to 204° C.

In some cases binding agents (tackifiers), activators, and other additives may be added from dispensers 21 simultaneously or immediately following the secondary steaming as described below. Also, dye may be injected into the steam from dye injector 26 feeding into the secondary steam chamber 9 to colorize the mulch matrix. In this case, the dye is mixed with steam by injecting into the steam line prior to steam application chamber 9, and the steam becomes the carrier that promotes the absorption and retention of the dye by the fiber matrix. The steam properties at dye injection 26 and prior to application to the fiber mulch mix are as follows:

Desired Pressure Range: 276 kPa-1050 kPa
Desired Temperature Range: 100° C.-250° C.

This second steaming step in the manner described above results in several important product qualities. The steam softens the fibers, and makes them more malleable and therefore able to flow through standard hydroseeding pumps more readily. Standard hydroseeding pumps include but are not limited to centrifugal pumps, gear pumps, and progressive cavity pumps. After steam application, the softened and less rigid mulch fibers are more easily pushed aside by plant sprouts as they emerge from the seedbed underneath the mulch. Moreover, steaming breaks down, dissolves and/or creates pores in the waxy film that covers the natural fibers. Full or partial removal of the waxy layer makes the natural fibers more hydrophilic, and promotes a more efficient release and activation of the absorbed binding agents once the fiber matrix is mixed with water prior to spray application. A more absorbent plant material remains softer in the water-mulch slurry. There is also increased dye absorbency and retention, and the mulch has a greater ability to rewet once it has been applied to the soil.

For mixing, the mixing and steaming chamber 9 may make use of a conventional auger or paddle type mixing system. The primary axis of the mixing system may or may not oscillate, and given oscillation the oscillation direction may be parallel or perpendicular to the auger or paddle shaft axis. The system may include multidirectional flow or reversing flow to promote homogenous mixing. The mixing chamber 9 may make use of forced air and/or cyclonic mixing. Moreover, steaming followed by drying causes the natural fibers, particularly the cotton lint fibers, to shrivel and curl, improving the fiber's ability to entangle about other fibers and form mechanical joints with these fibers.

The first and second components (if more than one component is used) are sufficiently mixed together to intermingle and entangle the fibers of one component about the other component to form a substantially homogeneous mixture in a 3-dimensional fiber entangled matrix. In the case that 100% cotton plant material is used, the fibers are mixed to promote the entanglement of the cotton plant fibers with themselves. This entanglement of a portion of the mulch fibers provides a foundation for a strong mulch matrix that effectively resists movement by exterior forces such as water and wind once applied to the soil After steaming, at step 700 optional adjuvants may be added though ingredient feeders 21. A variety of optional agents may be added to the first or second cellulosic components or the mixture thereof, before, during or after processing. For example, when producing mulches, one or more of surfactants, viable mature plant seeds (such as seeds of the desired crop or ground cover), fertilizers (including animal manures) or soil conditioners such as urea or phosphorous, pesticides (including herbicides, insecticides, and fungicides), and colorants or dyes, may be added. In one preferred embodiment, one or more of tackifiers, polymers, guars, cementitous tackifiers such as polyacrylamide and flocculating agents (for water clarification) may be added.

At step 800 the composition is then dried in drier 25 and subsequently cooled at 27 to form a dried product suitable for use as a sprayable hydraulic mulch, for example, to prevent soil erosion, prevent or reduce weed growth, enhance desired vegetation growth, increase soil water retention, promote proper amount of rainfall infiltration and/or moderate soil temperature.

The dryer 25 may be any suitable commercial convection drying oven capable of attaining the following desired conditions:

Composition fibers at 50 percent or less moisture content should be dried at an air temperature greater than 93° C. but less than 204° C. for at least eight minutes;

Composition fibers at 50.1 percent or greater moisture content should be dried at an air temperature above 93° C. but less than 204° C. for no greater than 15 minutes.

Some government or regulatory agencies (foreign or domestic) may require heating for durations longer than the aforementioned time frame for the purposes of sterilization. In these cases, the product composition may be heated for longer than 15 minutes. During this additional heat exposure the intention is to maintain the moisture levels so that the composition is not excessively dried. An excessively dry mulch composition will likely become brittle and compromise the desired aspect ratio and fiber integrity in processing downstream of the dryer. An excessively dried composition also prevents obtaining the desired rate of compaction for packaging.

Composition fibers are heated/dried above 90° C. for the aforementioned duration in part to reduce or eliminate the microbial activity. A reduction or elimination of microbial activity at this stage will give the desired result of reducing the likelihood of premature decomposition of the mulch fibers in the packaging and after application. It is also desirable to reduce or eliminate microbial activity so that the rate of decomposition (once the mulch has been applied to the seedbed) is more consistent from lot to lot of finished product.

If desired, an array of binding agents (tackifiers), rewetting agents, activators, and other additives may be added to the composition during drying.

Convection and/or microwave heating also dries the natural fibers and reduces their physical size due to the removal of the water that had infiltrated the fibers' pore space causing it to "swell". Smaller fibers allow for denser packaging on a dry weight basis, and this translates into increased quantity of fibers per unit of packaged volume compared to fibers which have not been dried in this manner. Small dried fibers yield increased absorption rates when mixed with water and applied. This also translates into greater absorbency when rewetted by natural rainfall or watering. Furthermore, greater absorption rates create a slurry that is more easily pumped. Once packaged, drier fibers are less likely to experience premature decomposition. Heated drying cures any dye that has been absorbed into the fibers, which prohibits excessive and premature dye leaching. Drying decreases the likelihood of premature product decomposition and therefore increases the shelf life of the packaged product.

Heating at the aforementioned ranges creates an environment suitable for a Maillard reaction resulting in the Nitrogen, Phosphorous, Potassium and micronutrients contained in the mulch fibers to be released within the desired time period. Without the Maillard reaction the nutrients could be released and made available to the seeded vegetation before the plants are completely capable of taking up and utilizing them.

Following drying, the dried mulch product is transported to and continuously mixed in mixing/accumulation chamber 28.

The final product is continuously mixed to ensure that the fiber components do not excessively separate on the basis or fiber size, therefore maintaining a homogeneous mixture. The product is transported from this mixing and accumulation chamber to the packaging equipment where it is packaged for storage and shipment.

Ultimately, the above-described packaged product will be mixed with water to form aqueous slurry for spray application. The fiber entangled matrix composition provides enhanced soil adherence (i.e., anchoring) and runoff protection while at the same time providing enhanced visual coverage over the soil. Further, the sprayble mulch composition unexpectedly provides enhanced dewatering characteristics, and thus requires less water to apply than conventional hydraulically applied mulches, "Dewatering" generally refers to the problem encountered during pumping of a mulch slurry wherein the solid mulch material tends to separate in the tank and thus a greater proportion of water is actually sprayed, leaving a residual, "dewatered" sludge in the tank which requires the addition of additional amounts of water before it can be sprayed. When in an aqueous slurry, the compositions of this invention exhibit a significantly reduced tendency to separate when compared to similar materials not processed in this manner, and a smaller amount of dewatered solids remain in the tank following a spraying application. The hydrophilic condition created in these natural mulch fibers by the steaming process enables the mulch fibers to exhibit these preferred "dewatering" characteristics.

Using a ratio of cotton byproduct and plant material as described above in a ratio of 8:2 or greater, processed by fiberizing, steaming and drying, yields a spray-on mulch product that absorbs greater amounts of water per unit volume than the lower ratios previously described. Moreover, the cotton lint contained in the byproduct requires more time for complete decomposition and therefore provides soil coverage for greater periods of time than lower ratios of cotton byproduct to other plant materials.

Figure 3:
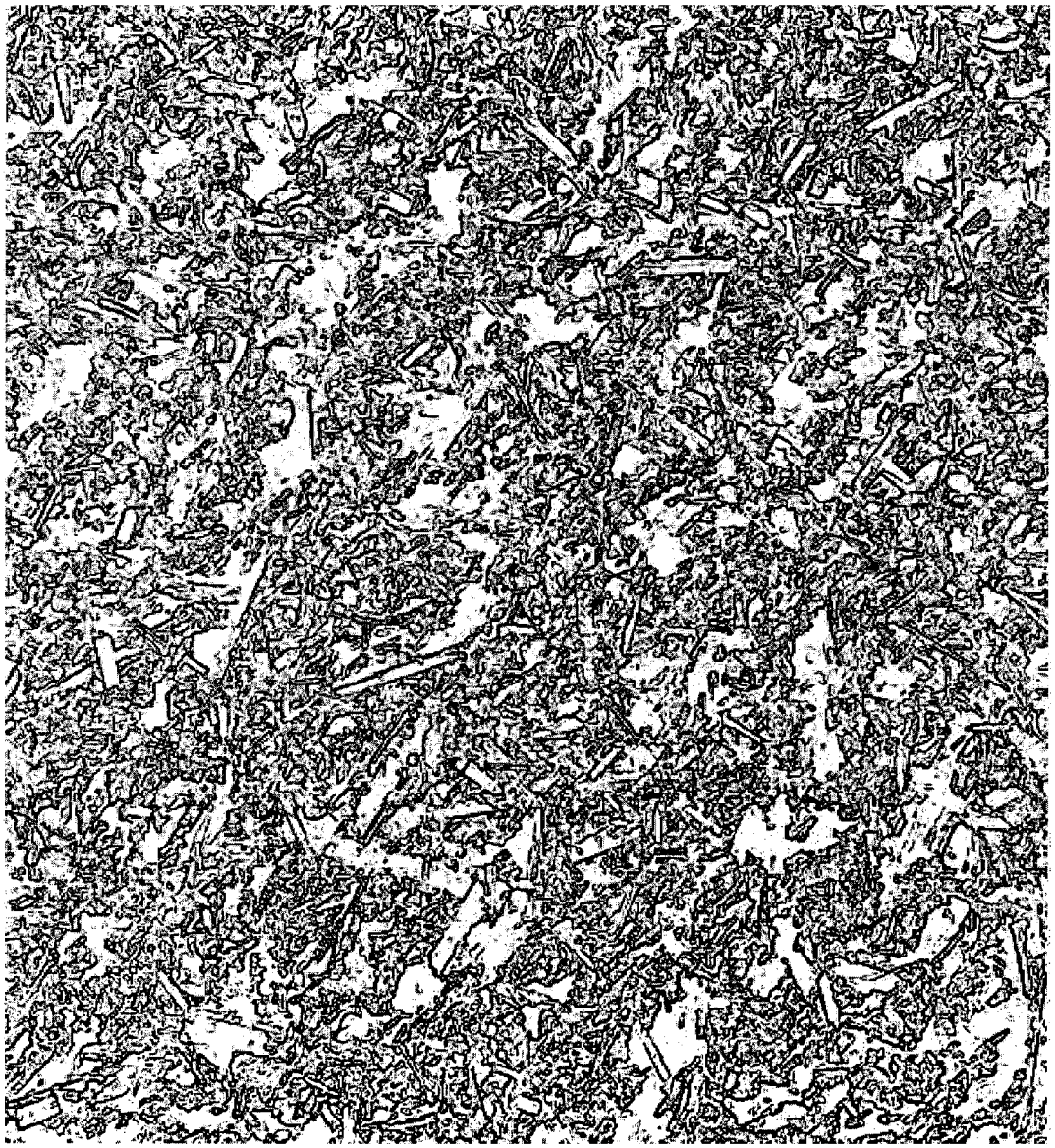
FIG. 3 illustrates the hydromulch product produced in accordance with the method of the present invention.

By way of example, the above-described process was used to produce a hydromulch product as shown in FIG. 3. In this example, the first component was 25% unprocessed cotton gin waste (random lint, sticks, leaves, burs, soil particles, other plant materials, and motes), while the second component was 75% cellulosic (plant derived) hay. At step 200, both of the first and second components were cut at cutting stations 12, 13 to a mean size (length) of 25 mm or less, and the aspect ratio of the hay was maintained at 15. At step 300 both components were pre-cleaned in cyclone separators 14 and 15 to remove dirt and dust particles. At step 400 the first stage steam processing took place in steam application chambers 6, 7 at 130 kPa pressure and 110° C. temperature to establish the desired moisture level. At step 500 the steamed product was shredded in fiberizing bins 16, 17 subject to a sieve analysis in which 50% of the individual fibers maintain a fiber length greater than 4 mm, more than 60% by weight of each of the first and second components in the final composition should have a fiber length greater than 1.5 mm, and the cotton lint component has an Upper Quartile Length between 6.3 mm and 19.1 mm as measured indirectly by weight by Advanced Fiber Information System (AFIS). Next, at step 600 the composition is subjected to secondary steam processing in steam application and mixing chamber 9 at 175 kPa, and 165° C. At step 800 the composition was dried in dryer 25 at 150° C. for ten minutes, and then continuously mixed in mixing/accumulation chamber 28 to yield the mulch product shown in FIG. 3. The 3-dimensional fiber entangled matrix is robust enough to maintain position when sprayed on hills, embankments, etc., and yet the fibers are malleable enough to be displaced or deformed by plants as they emerge through the mulch from the seedbed below.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A method for making sprayable hydraulically applied mulch, comprising the steps of:
    obtaining a quantity of a biofiber composition comprising a natural fibrous material which fibers bear a waxy coating;
    shredding or fiberizing said biofiber composition;
    introducing said shredded or fiberized biofiber composition into a steaming chamber and steaming to break down and create pores in the waxy coating of said fibers and to in combination with drying, cause the natural fibers to curl and entangle about one another;
    mixing the steamed and shredded or fiberized biofiber composition;
    introducing said shredded, mixed and steamed biofiber composition into a drying chamber for drying; and cooling said mixed, steamed and dried biofiber composition.

2. The method according to claim 1, further comprising a step of steaming said biofiber composition prior to shredding to soften the fibers in order to maintain the desired aspect ratio and avoid pulverizing component fibers during shredding or fiberizing.

3. The method according to claim 1, wherein said natural fibrous material comprises cotton byproduct including lint or linters, and said method further comprises a step of separating said lint and linters from said cotton byproduct prior to said shredding or fiberizing step.

4. The method according to claim 3, further comprising a step of shredding/fiberizing said separated lint and linters, and a step of steaming said shredded/fiberized lint and linters, independently of the other cotton byproduct.

5. The method according to claim 1, wherein said step of obtaining a quantity of a biofiber composition comprises obtaining two separate cellulosic biofiber components including cotton byproduct and cellulosic material.

6. The method according to claim 5, wherein said cotton byproduct comprises a mixture of lint, linters and other cotton byproducts.

7. The method according to claim 6, wherein said cellulosic material comprises any one from among the group consisting of plant derived hay, grass, kenaf, straw, coconut, bamboo, hemp, bagasse and plant residue.

8. The method according to claim 6, further comprising the step of separating the lint and linters from said other cotton byproducts prior to shredding or fiberizing said biofiber composition.

9. The method according to claim 8 wherein said separated lint and linters are processed independently.

10. The method according to claim 9 wherein said step of shredding or fiberizing said biofiber composition reduces an average fiber length of said stems, sticks, etc to within a range of from 4 mm to 8 mm.

11. The method according to claim 8, wherein said lint and linters are separated by any one or more of an incline cleaner, green leaf and stick machine, bur extractor, or refined cotton lint extractor.

12. The method according to claim 11 wherein said separating step reduces the lint content by weight in said other cotton byproducts to less than 5%.

13. The method according to claim 12 wherein said separating step reduces the lint content by weight in said other cotton byproducts to less than 2%.

14. The method according to claim 11 wherein said separating step reduces the lint content by weight in said other cotton byproducts to less than 1%.

15. The method according to claim 8, wherein the moisture levels of said biofiber components are maintained at predetermined levels throughout all of said steps.

16. The method according to claim 15, wherein said step of obtaining said first quantity of cellulosic cotton byproducts and said second quantity of cellulosic biomaterial comprises obtaining relative amounts of said first quantity of cellulosic cotton byproducts and said second quantity of cellulosic biomaterial in a ratio of between 8:2 to 10:0, by weight.

17. The method according to claim 1, wherein said step of mixing said biofiber composition is completed within said steaming chamber.

18. The method according to claim 1, wherein said step of drying said biofiber composition comprises convection drying.

19. The method according to claim 1, wherein said step of drying said biofiber composition comprises microwave drying.

20. The method according to claim 1, wherein said step of obtaining a quantity of a biofiber composition comprises obtaining a first quantity of cellulosic cotton byproducts, and obtaining a second quantity of cellulosic biomaterial.

21. The method according to claim 20, wherein said second quantity of cellulosic biomaterial comprises any one or more biomaterials selected from among the group of hay, grass, kenaf, straw, coconut, bamboo, hemp, bagasse and plant residue.

22. The method according to claim 21, wherein said plant residue comprises any one or more from among the group including cereal grains, rice, soybeans, grass seed, wood, sawdust, wood pulp, paper, or mixtures thereof.

23. The method according to claim 21, wherein said step of mixing said biofiber composition comprises mixing said first quantity of cellulosic cotton byproducts and said second quantity of cellulosic biomaterial entangle said fibers in a 3-dimensional matrix.

24. The method according to claim 23, wherein said step of mixing the biofiber composition comprises mechanical mixing in a mixing chamber and is accompanied by steam and dye injection into the mixing chamber.

25. The method according to claim 24, wherein said step of steam injection into said mixing chamber is preceded by dye injection into a steam line.

26. The method according to claim 24, wherein said step of dying hay, grass, kenaf, straw, coconut, bamboo, hemp, bagasse, cereal grains, rice, soybeans, grass seed, and plant residue or mixtures thereof produces a colorized fiber to be used in the production of erosion control blankets.

27. The method according to claim 21, wherein said step of obtaining said first quantity of cellulosic cotton byproducts and said second quantity of cellulosic biomaterial comprises obtaining relative amounts of said first quantity of cellulosic cotton byproducts and said second quantity of cellulosic biomaterial in a ratio of between 5:95 to about 7:3, by weight, respectively.

28. The method according to claim 27, wherein said step of obtaining said first quantity of cellulosic cotton byproducts and said second quantity of cellulosic biomaterial comprises obtaining relative amounts of said first quantity of cellulosic cotton byproducts and said second quantity of cellulosic biomaterial in a ratio of between 1:9 to about 6:4, by weight, respectively.

29. The method according to claim 28, wherein said first quantity of cellulosic cotton byproducts comprises any one or more cotton byproduct from among a group comprising lint, linters, burs, sticks, roots, leaves, motes, neps, immature seeds, seed hulls, seed coat fragments, and mixtures thereof.

30. The method according to claim 29, wherein said first quantity of cotton byproducts are selected from the group comprising cotton gin byproducts, byproducts from textile mills, byproducts from cottonseed oil mills, cotton field residue and mixtures thereof.

31. The method according to claim 28, wherein said step of drying said shredded or fiberized, mixed and steamed biofiber composition comprises convection drying fibers containing a 50.1 percent or greater moisture content at an air temperature of approximately 93° C.-204° C. for at most fifteen minutes.

32. The method according to claim 1, wherein said step of steaming said biofiber composition comprises steaming in a steaming chamber or chambers at a pressure range between atmospheric and approximately 207 kPa and at a temperature within a range of from approximately 93° C.-204° C.

33. The method according to claim 32, wherein said step of drying said shredded or fiberized, mixed and steamed biofiber composition comprises convection drying fibers containing a 50 percent or less moisture content at an air temperature of 93° C.-204° C. for at least eight minutes.

34. The method according to claim 33, wherein said step of steaming said biofiber composition makes the composition more hydrophilic and therefore better equipped to absorb dye and additives, also providing improved pumping characteristics.

35. The method according to claim 33, wherein said step of steaming said biofiber composition sterilizes any seeds contained in the composition and inhibits or eliminates microbial activity.

36. The method according to claim 1, wherein said step of shredding or fiberizing causes the cotton lint portion to have an Upper Quartile Length between 6 mm and 19 mm as measured as indirectly by weight by Advanced Fiber Information System (AFIS).

\* \* \* \* \*